(No Model.)

R. M. HUNTER.
ELECTRIC RAILWAY.

No. 385,180. Patented June 26, 1888.

Attest.
Henry Drury
E. M. Breckinread

Inventor.

N. PETERS, Photo-Lithographer, Washington, D. C.

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 385,180, dated June 26, 1888.

Application filed March 15, 1888. Serial No. 267,224. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electrically-propelled vehicles; and it consists of certain improvements fully set forth in the following specification and shown in the accompanying drawings, which form part thereof.

The object of my invention is to provide suitable means for regulating the power of the motor with storage-batteries or other source of power where a current of constant potential and varying current is supplied.

This invention is particularly adapted to electrically-propelled vehicles—be they cars, carriages, aerial ships, or boats—in which the source of power is secondary batteries or accumulators. In practice I find that it is impossible to make secondary batteries of uniform resistance, and hence, if they are coupled in parallel or other connections than in series, they are apt to discharge unequally and render it a difficult matter to properly charge them where the service required with a limited plant is large. Instead, therefore, of keeping the motor-resistance uniform and varying the electro-motive force of the batteries to obtain a difference in power, I arrange the cells in series to form one or more batteries, which may be coupled in series or parallel, as each battery (composed of many cells) would be charged and discharged equally over all of the cells composing it. I may vary the resistance exterior to the source of power in many ways, some of which may be enumerated as varying the internal resistance of the motor either by cutting in or out its coils or by coupling up said coils in various ways, or by varying a resistance in the motor-circuit and exterior of the motor, or both combined.

I do not limit myself to any specific way of accomplishing the result.

Figure 1:
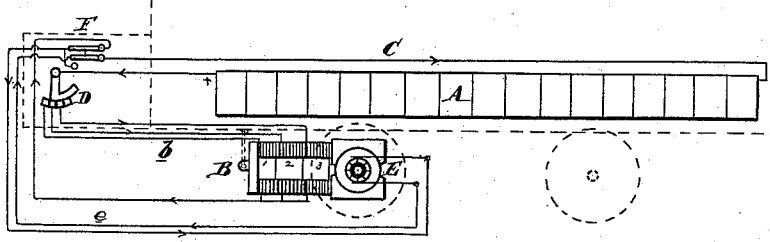
Figure 2:
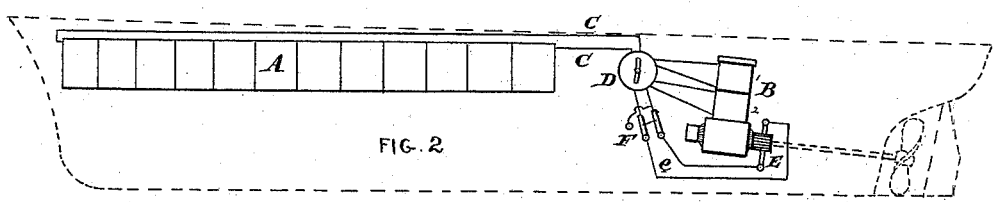
Figure 3:
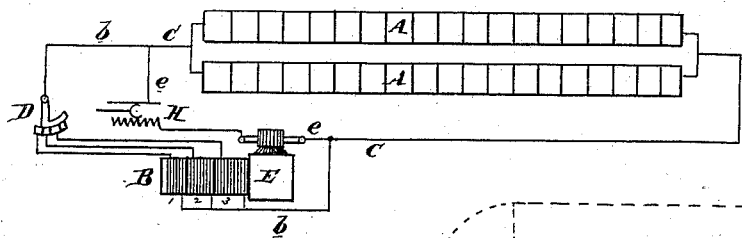
Figure 4:
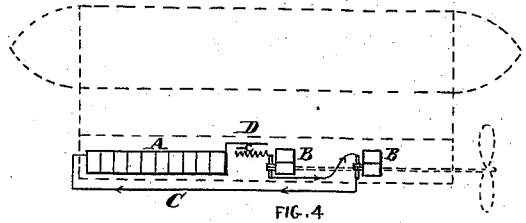
Figure 5:
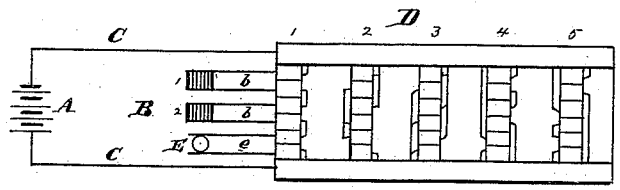

In the drawings, Figures 1 to 4 are diagrams illustrating various ways of embodying my invention, and Fig. 5 is a diagram illustrating one form of switch for the construction shown in Fig. 2.

In Fig. 1 the cells of the battery A are arranged in series. B is the motor, which has a field composed of several coils, 1, 2, and 3. E is the armature. D is the controlling-switch for the field-coils, and F is the reversing-switch for the armature. The armature is in series with the field and with the battery. By moving switch D, I can cut out or in one or more of the field-coils, and thus vary the motor resistance and power without varying the battery-connections.

In Fig. 2 I have the battery A connected by circuit C with a controlling-switch, D, from which extends the motor-circuit c and field-circuits b to the various coils of the field-magnets. F, as before, is the reversing-switch in the armature-circuit c. The switch D is shown in Fig. 5. The connection 1 couples the field-coils and armature all in series with each other and battery A. Connection 2 couples the field-coils in multiple and in series with the armature and battery. Connection 3 couples all of the field-coils and armature in multiple and in series with the battery. The connection 4 couples the field-coils in series with the battery and the armature in series with the battery, but the field-coils and armature in parallel forming a shunt-wound motor. Connection 5 couples one of the field-coils in series with the armature and the battery and the other coil in parallel with the first-mentioned field-coil and armature, but in series with the battery. In all cases the motor-circuit or motor-resistance is varied and the connection of the cells in series with the motor remains the same. From this it is seen that the battery-cells all discharge uniformly and may be recharged uniformly or in series.

In Fig. 3 I show two batteries, A A, coupled in parallel; but I do not care to use this connection as a rule. It would be resorted to when a large current was required. However, it is seen that in discharging, if one battery discharged more rapidly than the other, I would have all the cells in each battery discharging alike, as in the other cases. In the motor-connections here I have a switch, D, to vary the field-resistance, as before, and a separate resistance-changer, H, to vary the current flowing to the armature. The motor here shown is shunt-wound.

In Fig. 4 I have a simple circuit with a resistance-changer, D, in the motor-circuit to regulate the resistance and thereby control the current flowing to the motor from the battery, coupled as it is for full electro-motive force.

It is evident that, while I have only shown one motor in Figs. 1 to 3, several motors may be controlled in the same way and by the same controlling devices as shown in Fig. 4.

In Fig. 1 is dotted a car showing the invention applied thereto, the motor connecting with the axle and the battery on the car-body.

In Fig. 2 I illustrate the invention as applied to a boat.

In Fig. 4 I illustrate the invention as applied to an aerial ship.

The details of the connections are immaterial to my invention, and may be varied to suit the purpose for which they are to be applied.

Having now described my invention, what I claim as new, and desire to secure by Letters Patent, is—

The method of propelling and controlling an electrically-propelled vehicle supplied with motive power from secondary batteries carried by the vehicle, which consists in coupling up the cells of the battery or batteries in fixed relation, supplying the motor or motors propelling the vehicle with the full current of the battery, and varying the speed and power of the motor or motors by coupling up the coils of the motor or motors in different relations to vary their internal resistance.

In testimony of which invention I hereunto set my hand.

RUDOLPH M. HUNTER.

Witnesses:
E. M. BRECKINREED,
HENRY DRURY.